Nov. 18, 1924.  
G. H. LANCHESTER  
1,516,442  
MOTOR ROAD VEHICLE BRAKE  
Filed March 3, 1923  
2 Sheets-Sheet 2

Inventor  
G. H. Lanchester  
By Marks&Clerk Attys

Patented Nov. 18, 1924.

1,516,442

UNITED STATES PATENT OFFICE.

GEORGE HERBERT LANCHESTER, OF BIRMINGHAM, ENGLAND, ASSIGNOR TO THE LAN-CHESTER MOTOR COMPANY, LIMITED, OF BIRMINGHAM, ENGLAND.

MOTOR ROAD-VEHICLE BRAKE.

Application filed March 3, 1923. Serial No. 622,625.

*To all whom it may concern:*

Be it known that I, GEORGE HERBERT LANCHESTER, a British subject, residing at Armourer Mills, Montgomery Street, Birmingham, in the county of Warwick, England, have invented certain new and useful Improvements relating to Motor Road-Vehicle Brakes, of which the following is a specification.

This invention has for its object to enable brakes of the drum type to be combined conveniently with the front or steering wheels of motor road vehicles.

The invention comprises the employement in conjunction with the expansible or contractible member or members of the brake which co-operates with the inner or outer periphery of a drum or the like on a road wheel, of an operating shaft which is rotatable about a horizontal or approximately horizontal axis, and a brake engaging member which is carried on the shaft and is rotatable about an axis in alignment or approximately in alignment with the pivot axis of the wheel.

Figure 1:
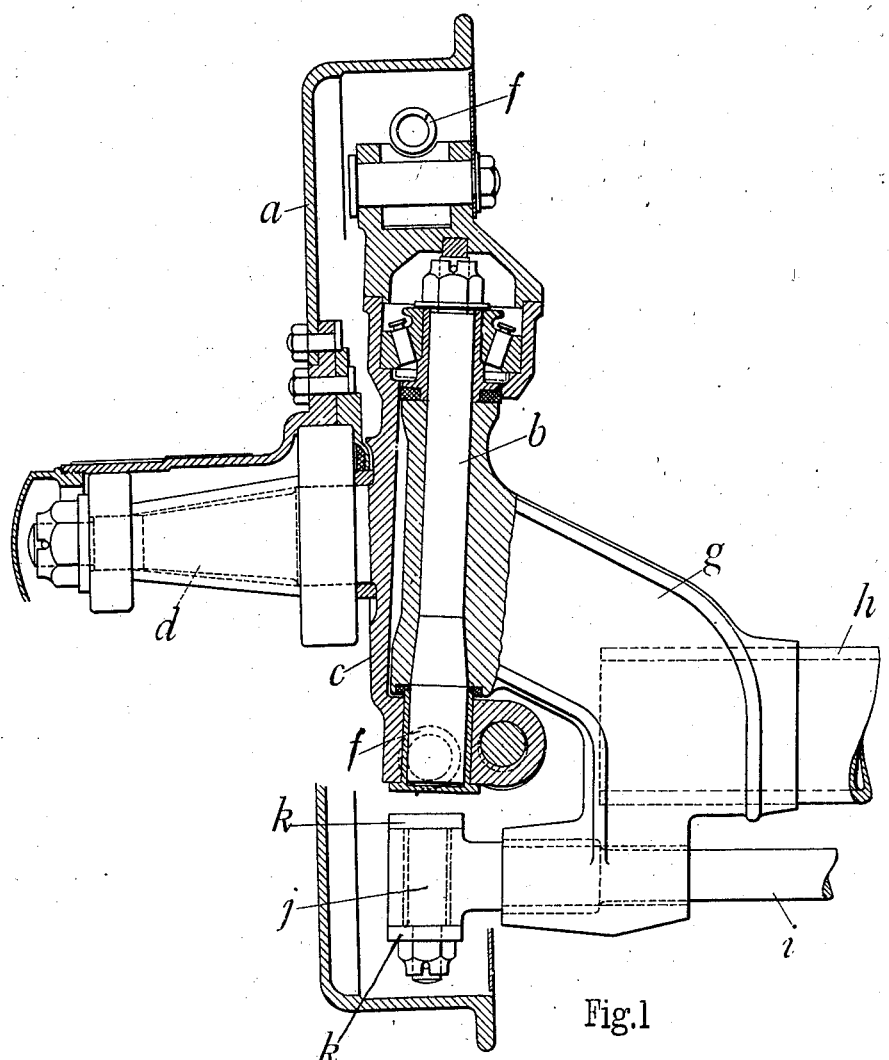
Figure 2:
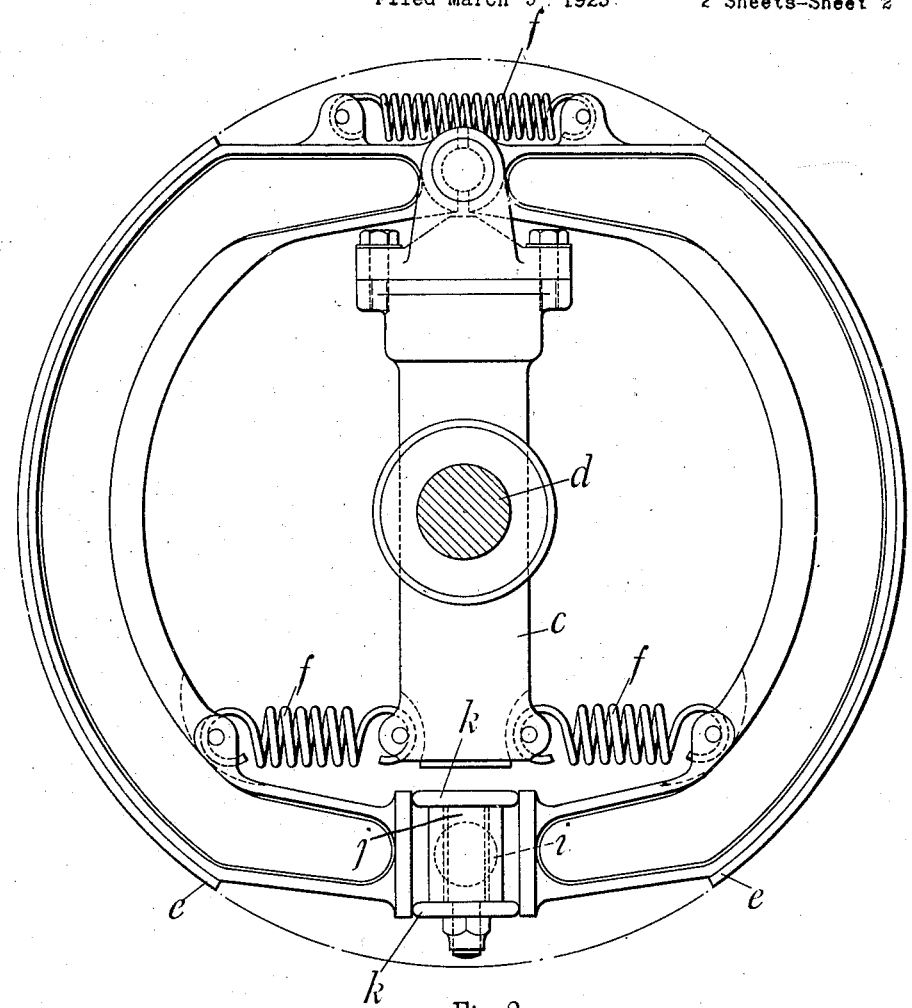
Figure 3:
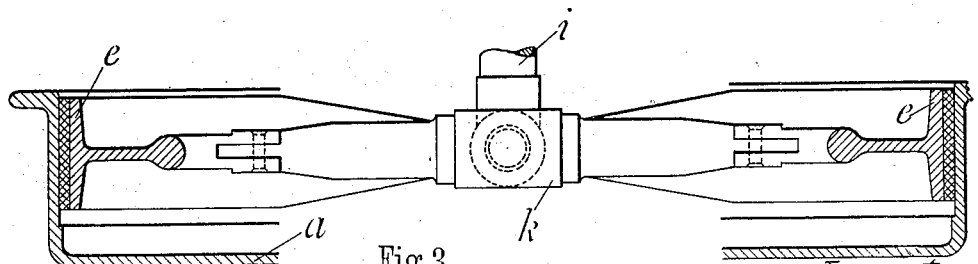

Referring to the two accompanying sheets of explanatory drawings, Figure 1 is a sectional front elevation, Figure 2 a side elevation, and Figure 3 a sectional plan illustrating an application of my invention to a front wheel of a motor road vehicle.

In carrying the invention into effect as shown the inner side of each front wheel of a motor vehicle has secured to it a shallow brake drum $a$ within which is arranged the vertical steering pivot post $b$. On opposite sides of the sleeve $c$ which fits over the post and is secured to the stub shaft $d$ are pivoted a pair of brake segments $e$ which co-operate with the internal periphery of the drum. These segments are normally held out of action by a spring or springs $f$. The pivot post $b$ is secured by a bracket $g$ to an axle $h$ which is preferably made of tubular form. The provision of a tubular axle enables the requisite torsional rigidity or stiffness to be obtained conveniently without excessive weight. The end bracket $g$ serves also as a bearing for a horizontal or approximately horizontal brake operating shaft $i$ which is preferably made in two parts, the latter being appropriately connected together at their adjacent ends and operated by a link and levers from a pedal. Similar brake mechanism is applied to each end of the axle $g$.

On each end of the operating shaft $i$ is arranged a brake engaging member consisting of a stem $j$ rotatably mounted in a socket at right angles to the shaft, and a pair of heads or collars $k$ at opposite ends of the stem for co-operating with the free ends of the brake segments, the end of the shaft and the said brake engaging member being located between the free ends of the brake segments. The axis of the stem $j$ of the brake engaging member is in line or approximately in line with the axis of the wheel pivot, so that movement of the road wheel about the pivot axis is accompanied by rotation of the brake engaging member, this provision being necessary to avoid interference with the steering movements of the wheel.

Expansion of the segments into engagement with the brake drum is effected by rotation of the aforesaid brake operating shaft $i$. When rotated the shaft carries with it the brake engaging member, and the above-mentioned heads $k$ at the end of the stem $j$, by pressing outwardly on the respective ends of the brake segments, force the latter into contact on the internal periphery of the drum. On returning the shaft the segments are restored to their original position by the spring or springs $f$.

By this invention I am able to arrange for the operation of brakes on the front or steering wheels of motor road vehicles in a very simple and convenient manner.

Having thus described my invention what I claim as new and desire to secure by Letters Patent is:—

In a motor road vehicle steering wheel brake, the combination comprising a wheel pivot, a drum on the wheel, a pair of hinged brake members located within the drum, a substantially horizontal operating shaft, a stem rotatably mounted on said shaft with its axis in alignment or approximately in alignment with the pivot axis of the wheel, and heads at the ends of the stem located between the adjacent free ends of the brake members and adapted to operate the same, substantially as described.

In testimony whereof I have signed my name to this specification.

GEORGE HERBERT LANCHESTER.